July 7, 1970   A. GOEKE   3,518,893
APPARATUS FOR TRANSMITTING TORQUE
Filed Feb. 18, 1969   8 Sheets-Sheet 4

FIG.4

INVENTOR
ALFONS GOEKE

By Michael S. Striker
Attorney

July 7, 1970  A. GOEKE  3,518,893
APPARATUS FOR TRANSMITTING TORQUE
Filed Feb. 18, 1969  8 Sheets-Sheet 5

INVENTOR
ALFONS GOEKE

FIG. 8

INVENTOR
ALFONS GOEKE

United States Patent Office 3,518,893
Patented July 7, 1970

3,518,893
APPARATUS FOR TRANSMITTING TORQUE
Alfons Goeke, Solingen, Germany, assignor to Th.
Kieserling & Albrecht, Solingen, Germany
Filed Feb. 18, 1969, Ser. No. 800,233
Claims priority, application Germany, Mar. 7, 1968,
1,652,592
Int. Cl. F16h 57/00
U.S. Cl. 74—405                                    10 Claims

ABSTRACT OF THE DISCLOSURE

A draw bench wherein the shaft of the sprocket wheels for the chains which reciprocate the carriage for pinchers is driven by a gear through the intermediary of an annulus of teeth provided on the shaft and a toothed cylinder whose teeth normally mesh with teeth of the shaft but can be disengaged therefrom in response to a predetermined resistance of the shaft to rotation with the gear. The cylinder is reciprocable in the hub of the gear and receives pressurized fluid through a conduit containing a pressure relief valve which opens when the resistance of the shaft to rotation with the gear reaches a predetermined value.

BACKGROUND OF THE INVENTION

The present invention relates to torque transmitting apparatus. More particularly, the invention relates to improvements in apparatus which can transmit torque from a shaft to a pulley, spur gear, sprocket gear or the like, or vice versa, and which ceases to transmit torque in automatic response to a predetermined resistance which the driven part offers to rotation with the driving part. The apparatus is particularly suited for use in draw benches or drawing benches wherein strips or rods of metal are drawn through dies to form elongated polygonal or round stock, for example, wire.

It is well known to employ in a draw bench chains of finite length as a means for moving a carriage for pinchers toward and away from the die block. The chains are subjected to tensional as well as to compressive stresses and are driven by sprocket gears or wheels which receive motion from a programmed drive. Serious problems arise when the programming system of the draw bench breaks down or fails to function properly, especially if the programming system permits the carriage to travel rapidly toward and to strike against the die block. During such movement, the chains push the carriage toward the die block and are likely to be damaged or destroyed or to damage or destroy their guides. Such guides are provided on the frame of the draw bench and prevent buckling of chains while the chains push the carriage toward the die block. The length of chains is selected in such a way that they permit movement of the carriage into immediate proximity of the die block at which time their free ends extend only slightly beyond the respective sprocket gears and into additional guides which guide the chains while the carriage moves away from the die block. During return movement, each chain comprises an upper stretch which is connected with the carriage and a lower stretch whose length increases in response to movement of the carriage toward the sprocket gears. The chains and/or their guides are also likely to be damaged if a pincher breaks or becomes disengaged from the stock to permit sudden dissipation of energy which is stored in the carriage and chains during movement of the carriage toward the sprocket gears. However, the likelihood of damage to chains and their guides is more pronounced when the upper stretches of the chains are subjected to compressive stresses, i.e., while the carriage travels toward the die block. If the programming system permits excessive acceleration of chains and a strong impact of the carriage against the die block, the pivots between the links of the chains are likely to buckle and to damage or destroy the guides.

In accordance with a presently known proposal which is described in German Pat. No. 1,147,187, portions of guides for the chains in a draw bench are provided with hinges which are biased by elastic means and permit such portions to yield in response to excessive compression of the chains. The elastic means absorbs energy which is released during buckling of the chains. It was found, however, that articulate guides are not entirely satisfactory, especially because they fail to react immediately to excessive compression of chains and because they cannot prevent excessive tensioning of chains. Also, as the wear on the guides progresses, the chains are likely to buckle in such portions of the guides which are not capable of yielding to predetermined stresses so that the chains and/or their guides are damaged or destroyed.

Endless chains are undesirable because they are likely to tear when the carriage is permitted to strike against the die block. Similar problems arise when the carriage is reciprocated by a rack and pinion drive.

SUMMARY OF THE INVENTION

An object of my invention is to provide a torque transmitting apparatus which embodies a safety feature to insure that the transmission of torque is terminated in automatic response to a predetermined resistance of the driven part to rotation with the driving part.

Another object of the invention is to provide a torque transmitting apparatus which is particularly suited for use in draw benches of the type wherein the carriage for pinchers is reciprocated by chains of finite length and wherein such chains are subjected to tensional as well as compressive stresses.

A further object of the invention is to provide a torque transmitting apparatus which can be used to transmit limited torque from a shaft to a spur gear, pulley, sprocket gear or vice versa.

An additional object of the invention is to provide a torque transmitting apparatus which comprises a small number of simple parts, which is rugged and capable of prolonged use, and which is adjustable so that the operator can select that resistance to rotation at which the driving part is disengaged from and can rotate with reference to the driven part.

Still another object of the invention is to provide a torque transmitting apparatus which can be installed in existing draw benches or other types of machine tools.

The improved torque transmitting apparatus comprises coaxial first and second rotary members, means for rotating at least one of the rotary members (for example, an electric motor can rotate a spur gear or sprocket gear which serves to normally transmit torque to a shaft), first and second toothed portions respectively provided on the first and second rotary members and one of these toothed portions being movable with reference to the respective rotary member between a first position in which it meshes with the other toothed portion and at least one second position in which it is disengaged from the other toothed portion so that the rotary members are respectively coupled to and uncoupled from each other in the first and second positions of the one movable toothed portion, and biasing means preferably including one or more springs or a hydraulic or pneumatic circuit, yieldably urging the movable toothed portion to first position and arranged to permit movement of the movable toothed portion to second position in response to a predetermined resistance offered by the other rotary member to rotation with the one rotary member.

The novel features which are considered as characteristic of the invention are set forth in particular in the appended claims. The improved torque transmitting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
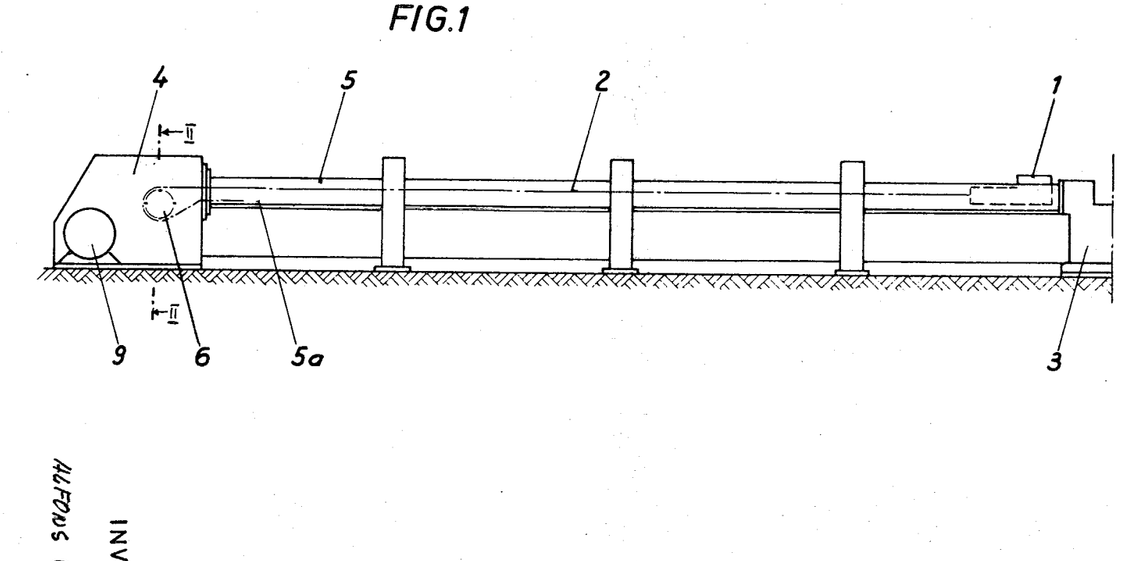
FIG. 1 is a schematic side elevational view of a machine tool including a torque transmitting apparatus which is constructed in accordance with a first embodiment of my invention.

FIG. 1 illustrates a portion of a draw bench or drawing bench for making wire or for drawing strips of metal which comprises a carriage 1 for pinchers (not shown) connected to two chains 2 of finite length. The carriage 1 is movable by the chains between a die block 3 and a housing 4 which accommodates a transmission. The chains 2 are trained over sprocket gears or wheels 6 (see also FIG. 2) and travel in elongated guides 5, 5a extending between and connected with the housing 4 and die block 3.

Figure 2:
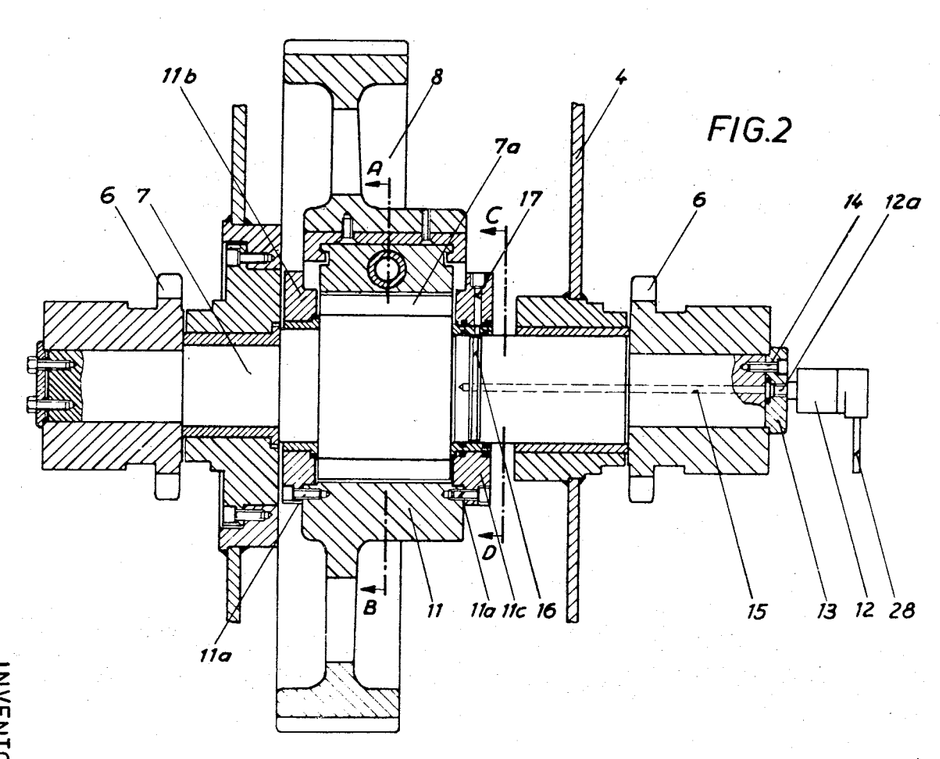
FIG. 2 is an enlarged transverse sectional view substantially as seen in the direction of arrows from the line II—II of FIG. 1 and illustrates several details of the torque transmitting apparatus.

As shown in FIG. 2, the sprocket gears 6 are fixedly mounted on a shaft 7 which constitutes one rotary member of my torque transmitting apparatus. The shaft 7 is driven by a second rotary member 8, here shown as a spur gear, which forms part of the transmission in the housing 4. The numeral 9 denotes in FIG. 1 an electric motor which drives the input member of transmission in the housing 4.

Figure 3:
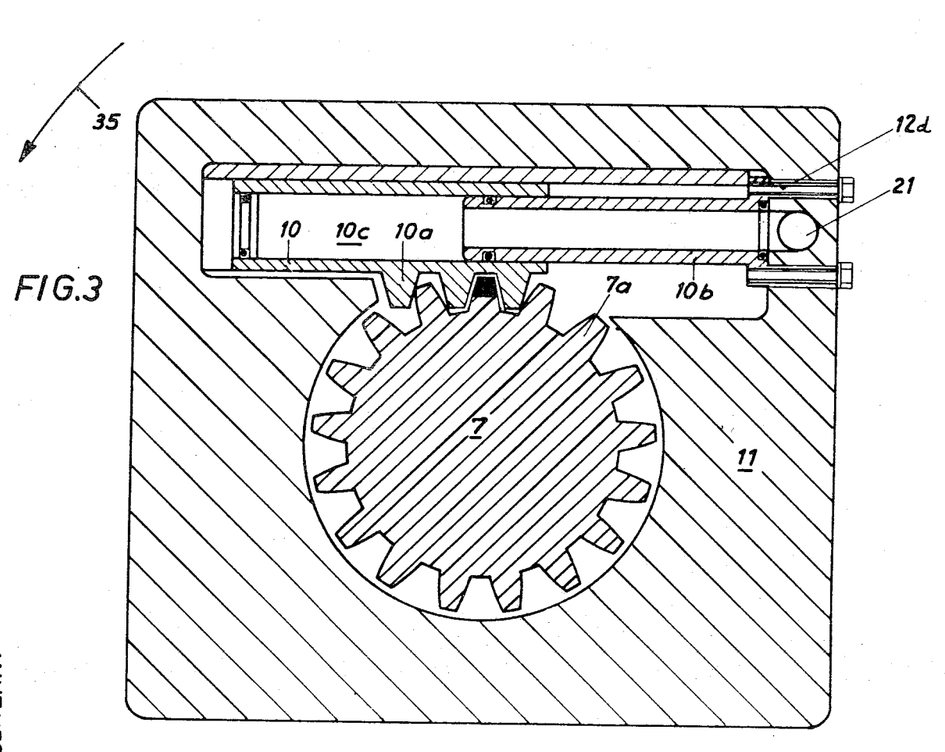
FIG. 3 is an enlarged sectional view as seen in the direction of arrows from the line A–B of FIG. 2.
Figure 4:
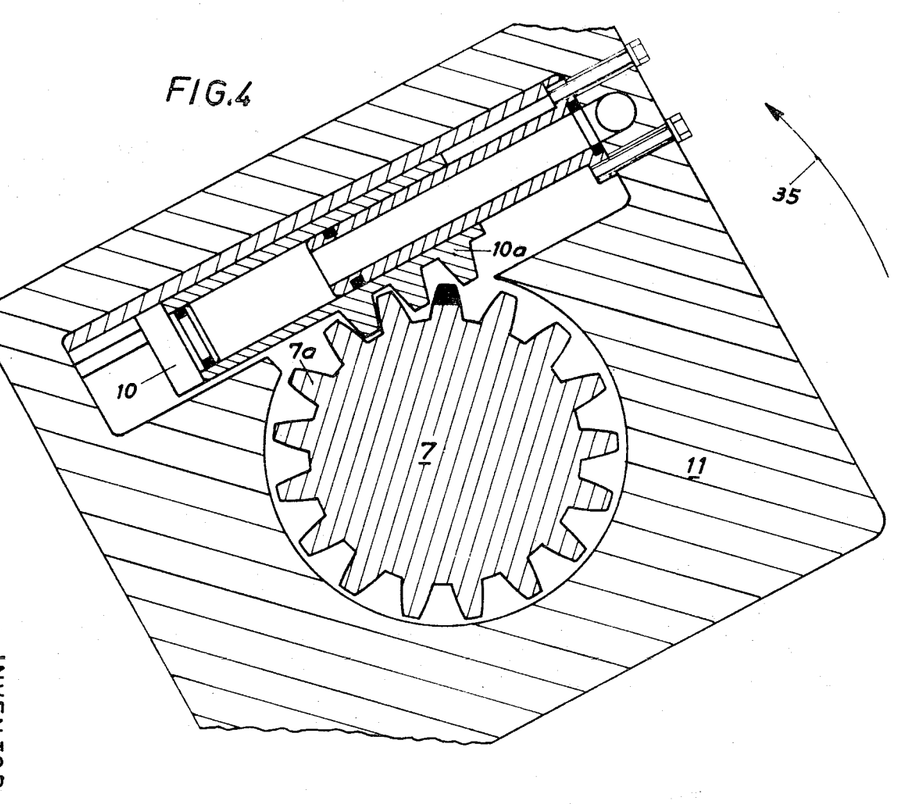
FIG. 4 is a similar sectional view bnt showing one rotary member of the apparatus in a different angular position.
Figure 5:
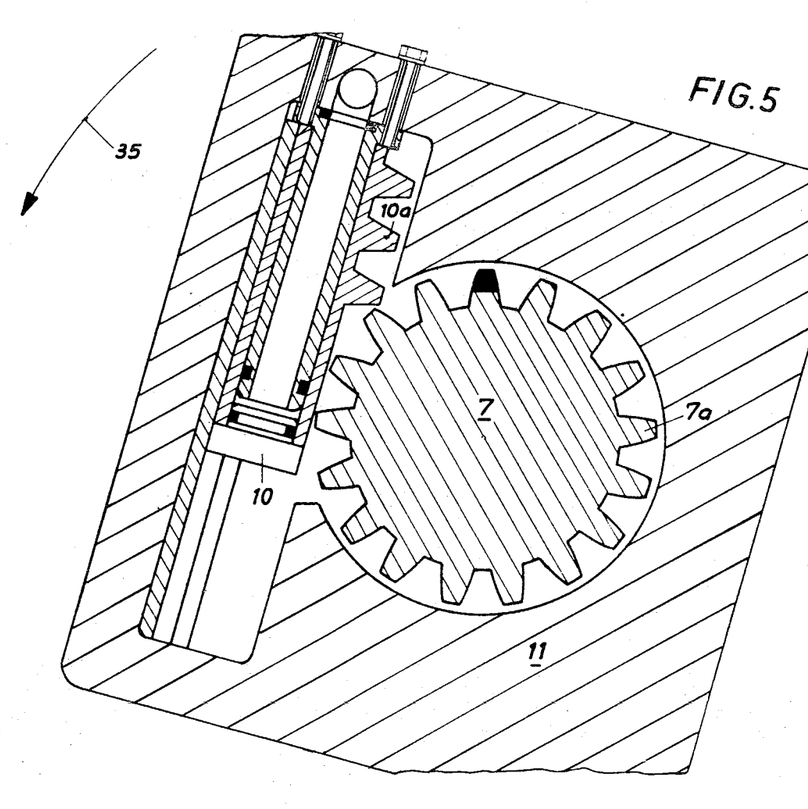
FIG. 5 is a similar sectional view but showing the one rotary member in a further angular position in which the two toothed portions are disengaged from each other.

FIG. 3 shows that the shaft 7 is provided with an annular toothed portion, including teeth 7a, which mates with a second toothed portion, including teeth 10a, provided on a hydraulic cylinder 10 which is reciprocable in a hub 11 of the spur gear 8. This cylinder 10 forms part of a biasing means which normally maintains its teeth 10a in mesh with the teeth 7a of the shaft 7. However, when the resistance which the shaft 7 offers to rotation with the gear 8 exceeds a predetermined value, the cylinder 10 moves with reference to the hub 11 from the first position of FIG. 3 through the intermediate position of FIG. 4 to the second position shown in FIG. 5 in which the teeth 10a are disengaged from the teeth 7a so that the gear 8 can rotate with reference to the shaft 7 in order to avoid damage to the sprocket gears 6, chains 2 and/or guides 5 and 5a. The teeth 10a are provided on a median portion of the cylinder 10. The latter is slidable on a hollow piston or plunger 10b which is mounted in the hub 11 and receives hydraulic fluid in a manner shown in FIGS. 2, 6 and 7. The pressure of hydraulic fluid is adjustable so that the operator can select that torque which suffices to cause the cylinder 10 to move from the first position of FIG. 3 to the second position of FIG. 5. Screws 12d (FIG. 3) connect the piston rod 10b to the hub 11. This hub is secured to a pair of rings 11b, 11c (FIG. 2) by screws 11a and the rings 11b, 11c are rigid with the remaining major part of the gear 8 so that they share all of its angular movements and rotate the hub 11. The hub 11 and rings 11b, 11c can be said to form integral parts of the gear 8.

Figure 6:
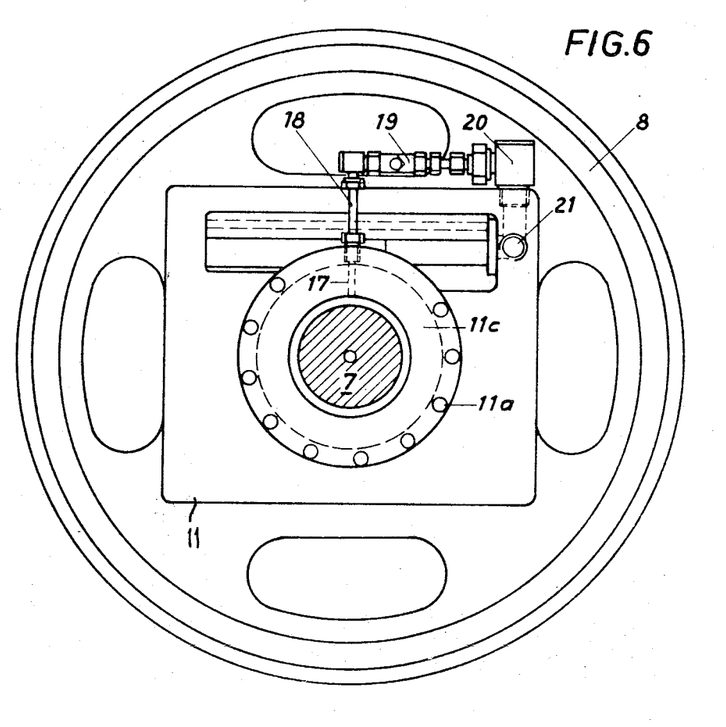
FIG. 6 is a sectional view as seen in the direction of arrows from the line C–D of FIG. 2.

The aforementioned biasing means further includes a system of conduits and channels which supply hydraulic fluid to the piston rod 10b. This system includes a conventional header 12 having a nipple 12a which is rotatable in a cap 13 secured to one of the sprocket gears 6 and/or to the shaft 7 by screws 14. The shaft 7 has axially and radially extending channels or bores 15, 16 which supply fluid from the nipple 12a into a channel 17 in the ring 11c. FIG. 6 shows that the channel 17 supplies fluid to a conduit 18 which communicates with additional conduits 19, 20 provided on the hub 11. The conduit 20 discharges fluid into a channel 21 of the hub 11 and this channel 21 discharges fluid into the interior of the hollow piston 10b.

Figure 7:
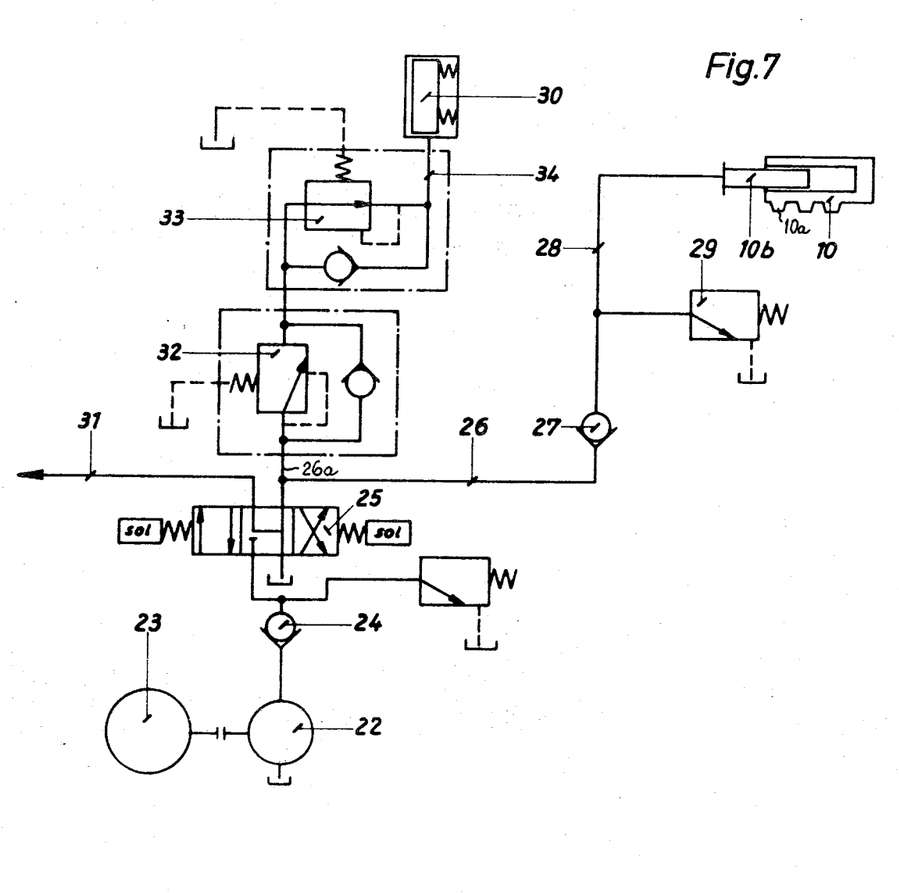
FIG. 7 illustrates the hydraulic circuit of the machine tool shown in FIG. 1.

FIG. 7 illustrates a part of the hydraulic circuit in the draw bench. This illustration further shows the cylinder 10, its teeth 10a, the piston rod 10b and a conduit 28 which delivers fluid to the header 12 (see also FIG. 2). The circuit includes a hydraulic pump 22 which is driven by an electric motor 23 and delivers pressurized fluid through a one-way valve 24 and a four-way solenoid-operated distributor valve 25. The distributor valve 25 has a first outlet which delivers fluid into a conduit 26 containing a one-way valve 27 and supplying fluid to the conduit 28 and thence to the header 12. A pressure relief valve 29 is connected with the conduit 28 and is adjustable to determine the maximum fluid pressure in the piston 10b. A second outlet of the distributor valve 25 is connected with a supply conduit 31 which delivers pressurized fluid to the closing mechanism for the pinchers (not shown) on the carriage 1 of the draw bench. A conduit 26a which branches from the conduit 26 delivers fluid to a clutch 30 by way of a pressure amplifying valve 32, a pressure reducing valve 33 and conduit 34. It is clear, however, that the pump 22 can be designed to deliver pressurized hydraulic fluid only to the conduit 28 and that the machine can be provided with a separate pump for the delivery of fluid to conduit 31 and/or 34.

The operation:

When the draw bench functions properly, the gear 8 drives the shaft 7, i.e., the toothed portion including the teeth 7a of the shaft 7 meshes with the toothed portion including the teeth 10a on the cylinder 10 which is then held in the first position shown in FIG. 3. It is assumed that the internal chamber 10c of the cylinder 10 is filled with hydraulic fluid whose pressure is determined by the valve 29. The arrangement is preferably such that the shaft 7 can stand a slight overload without causing opening of the relief valve 29. If the programming system which regulates the operation of the draw bench becomes ineffective so that the carriage 1 is propelled at a high speed toward and impacts against the die block 3, the gear 8 rotates in the direction indicated by arrow 35. The shaft 7 cannot rotate when the carriage 1 reaches the block 3; therefore, the cylinder 10 begins to move with reference to the hub 11 from the position of FIG. 3 to the position of FIG. 4 (in which the teeth 7a still mesh with the teeth 10a) and thereupon to the position shown in FIG. 5 in which the gear 8 is disengaged from and can rotate with reference to the shaft 7. The valve 29 opens and permits escape of some fluid from the conduit 28 when the cylinder 10 begins to leave the position shown in FIG. 3. The supply of fluid in the biasing means is replenished by the pump 22 by way of valves 24, 25, 27 and conduits 26, 28 as soon as the shaft 7 is again free to rotate with the gear 8.

It is clear that the improved torque transmitting apparatus can include the shaft 7 and one or both sprocket gears 6, i.e., that the gears 6 can be provided with hubs accommodating or supporting toothed portions corresponding to toothed portion of the cylinder 10 and normally meshing with teeth on the shaft 7. Furthermore, such torque transmitting apparatus can include a driver gear (not shown) which rotates the gear 8 and the shaft of such driver gear or a pulley and its shaft.

It is further clear that the biasing means for the cylinder 10 or an analogous carrier for teeth 10a may include one or more springs. However, the fluid-operated biasing means shown in FIGS. 2 to 7 is preferred at this time because a spring is likely to abruptly propel the teeth 10a back into mesh with the teeth 7a as soon as the resistance of the shaft 7 to rotation with the gear 8 decreases below a predetermined value. Such abrupt reengagement of teeth 10a with the teeth 7a could cause damage to the cylinder and/or shaft.

As stated before, the hub 11 can form an integral part of the gear 8. The means 11a, 11b, 11c for separably connecting the hub 11 to the gear 8 is provided to facilitate mounting of the piston 10b and cylinder 10 in the gear.

Figure 8:
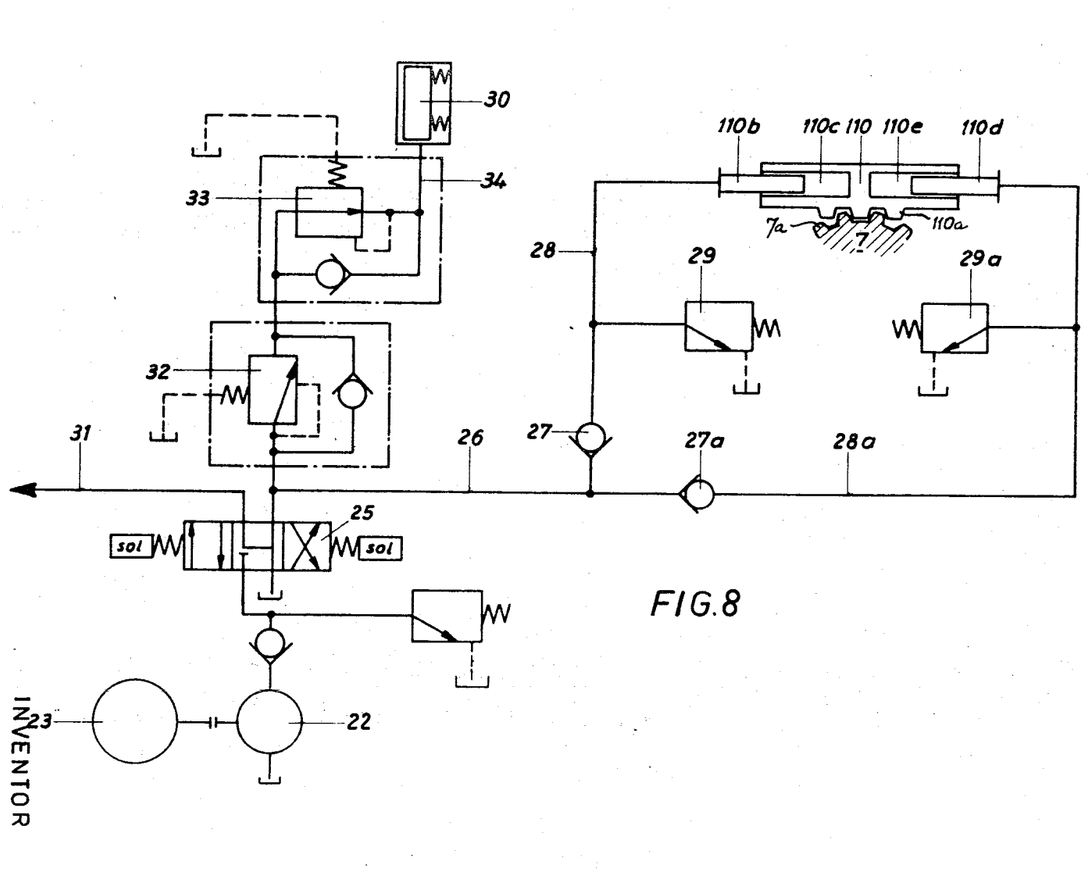
FIG. 8 illustrates the hydraulic circuit of a machine tool which embodies a modified torque transimtting apparatus.

FIG. 8 illustrates the hydraulic circuit of a modified machine. The left-hand part of this circuit is identical with the left-hand part of the circuit shown in FIG. 7. The conduit 26 delivers pressurized hydraulic fluid to discrete conduits 28, 28a, which respectively contain one-way valves 27, 27a and pressure relief valves 29, 29a. The hydraulic cylinder 110 of FIG. 8 has two internal chambers 110c, 110e for two coaxial hollow pistons or plungers 110b, 110d which respectively receive fluid from the conduits 28, 28a by way of parts similar to those shown in FIGS. 2 to 6 and denoted therein by numerals 12 to 21. The teeth 110a of the cylinder 110 mesh with teeth 7a of the shaft 7. The structure shown in FIG. 8 is capable of permitting rotation of the gear 8 (not shown) in either direction with reference to the shaft 7 when the shaft 7 is held against rotation in the respective direction. The pressure of fluid then rises in conduit 28 or 28a and the corresponding relief valve 29 or 29a opens to permit movement of the cylinder 110 in a direction to the left or to the right, as viewed in FIG. 8.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. Apparatus for transmitting torque, comprising coaxial first and second rotary members; means for rotating at least one of said rotary members; first and second toothed portions respectively provided on said first and second rotary members, one of said toothed portions being movable with reference to the respective rotary member between a first position in which it meshes with the other toothed portion and at least one second position in which it is disengaged from said other toothed portion so that said rotary members are respectively coupled to and uncoupled from each other in the first and second positions of said one toothed portion; and biasing means yieldably urging said one toothed portion to said first position and arranged to permit movement of said one toothed portion to second position in response to a predetermined resistance offered by the other rotary member to rotation with said one rotary member.

2. Apparatus as defined in claim 1, wherein one of said rotary members is a shaft and the other rotary member is a gear, said one toothed portion being provided on and being movable with reference to said gear.

3. Apparatus as defined in claim 2, wherein the toothed portion which is provided on said shaft comprises an annulus of teeth and said gear comprises a hub reciprocably accommodating said movable toothed portion.

4. Apparatus as defined in claim 3, further comprising means separably securing said hub to the remainder of said gear.

5. Apparatus as defined in claim 3, wherein said biasing means comprises a fluid-operated cylinder rigid with said movable toothed portion.

6. Apparatus as defined in claim 5, wherein said biasing means further comprises a hollow piston fixed to said hub and reciprocably supporting said cylinder.

7. Apparatus as defined in claim 1, wherein said biasing means includes a hydraulic circuit comprising pressure relief valve means arranged to open when the other rotary member offers said predetermined resistance to rotation with said one rotary member.

8. Apparatus as defined in claim 1, wherein said one toothed portion is movable between two second positions and assumes one of said second positions when said other rotary member offers a predetermined resistance to rotation of said one rotary member in a clockwise direction, said one toothed portion assuming the other second position when the other rotary member offers a predetermined resistance to rotation of said one rotary member in a counterclockwise direction.

9. Apparatus as defined in claim 8, wherein said biasing means comprises a hollow cylinder rigid with said movable toothed portion and having two coaxial chambers, a pair of pistons each extending into one of said chambers and each rigid with the respective rotary member, and a hydraulic circuit supplying pressurized fluid to said chambers by way of said pistons.

10. Apparatus as defined in claim 9, wherein said circuit comprises two discrete pressure relief valves one of which opens in response to a predetermined fluid pressure in one of said chambers and the other of which opens in response to a predetermined fluid pressure in the other chamber.

References Cited

UNITED STATES PATENTS

| | | | |
|---|---|---|---|
| 3,247,837 | 4/1966 | Wiseman | 74—405 X |
| 3,339,426 | 9/1967 | Borggräfe. | |

LEONARD H. GERIN, Primary Examiner